United States Patent [19]

Stella

[11] Patent Number: 4,768,552

[45] Date of Patent: Sep. 6, 1988

[54] VALVE ASSEMBLY FOR SINGLE-LEVER ACTUATED MIXER TAPS

[75] Inventor: Pietro Stella, Novara, Italy

[73] Assignee: Rubinetterte Stella S.p.A., Milan, Italy

[21] Appl. No.: 438,136

[22] Filed: Nov. 1, 1982

[30] Foreign Application Priority Data

Nov. 10, 1981 [IT]  Italy ................................ 24942 A/81

[51] Int. Cl.[4] .......................................... F16K 11/06
[52] U.S. Cl. .............................. 137/625.4; 137/625.17
[58] Field of Search ............ 137/625.17, 625.4, 625.42

[56] References Cited

U.S. PATENT DOCUMENTS

| | | | |
|---|---|---|---|
| 2,503,881 | 4/1950 | Manis | 137/625.4 |
| 3,794,074 | 2/1974 | Watts | 137/625.4 |
| 3,957,081 | 5/1976 | De Wavrin et al. | 137/625.4 |
| 3,965,935 | 6/1976 | Morisseau | 137/625.42 |
| 4,378,029 | 3/1983 | Parkison | 137/625.4 |

*Primary Examiner*—John Rivell
*Attorney, Agent, or Firm*—Guido Modiano; Albert Josif

[57] ABSTRACT

A valve assembly comprises a ceramic disk having peripheral recesses formed therein and being movable over a pair of ceramic tubular seats in communication with the cold water supply conduit and hot water supply conduit, respectively, and resiliently urged against the disk. The arrangement is such that with the disk and tubular seats at any mutual position, the disk overlies an arc of the periphery of the tubular seat orifices greater than half such periphery, with the recesses leaving free part or the entire orifice aperture.

7 Claims, 2 Drawing Sheets

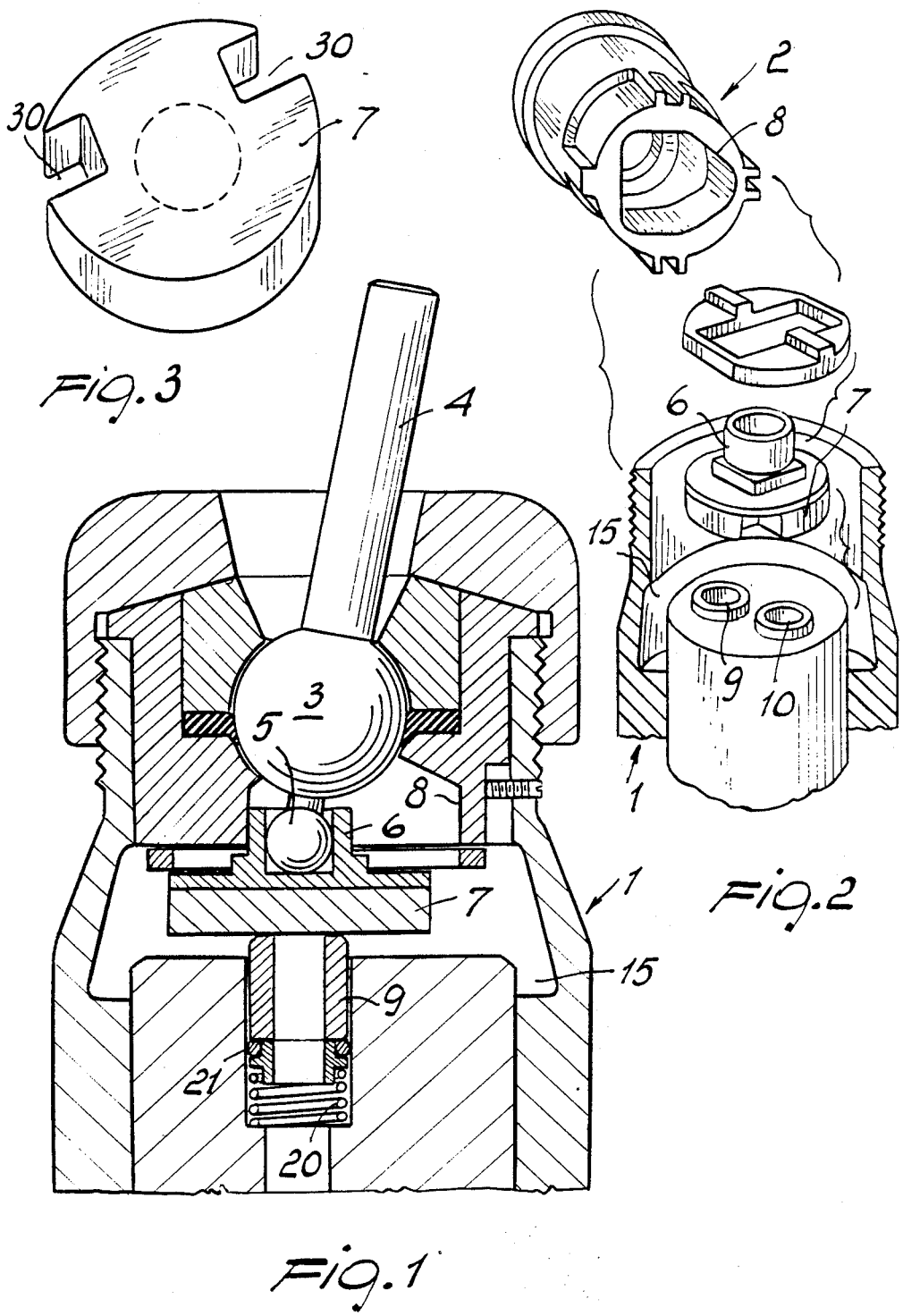

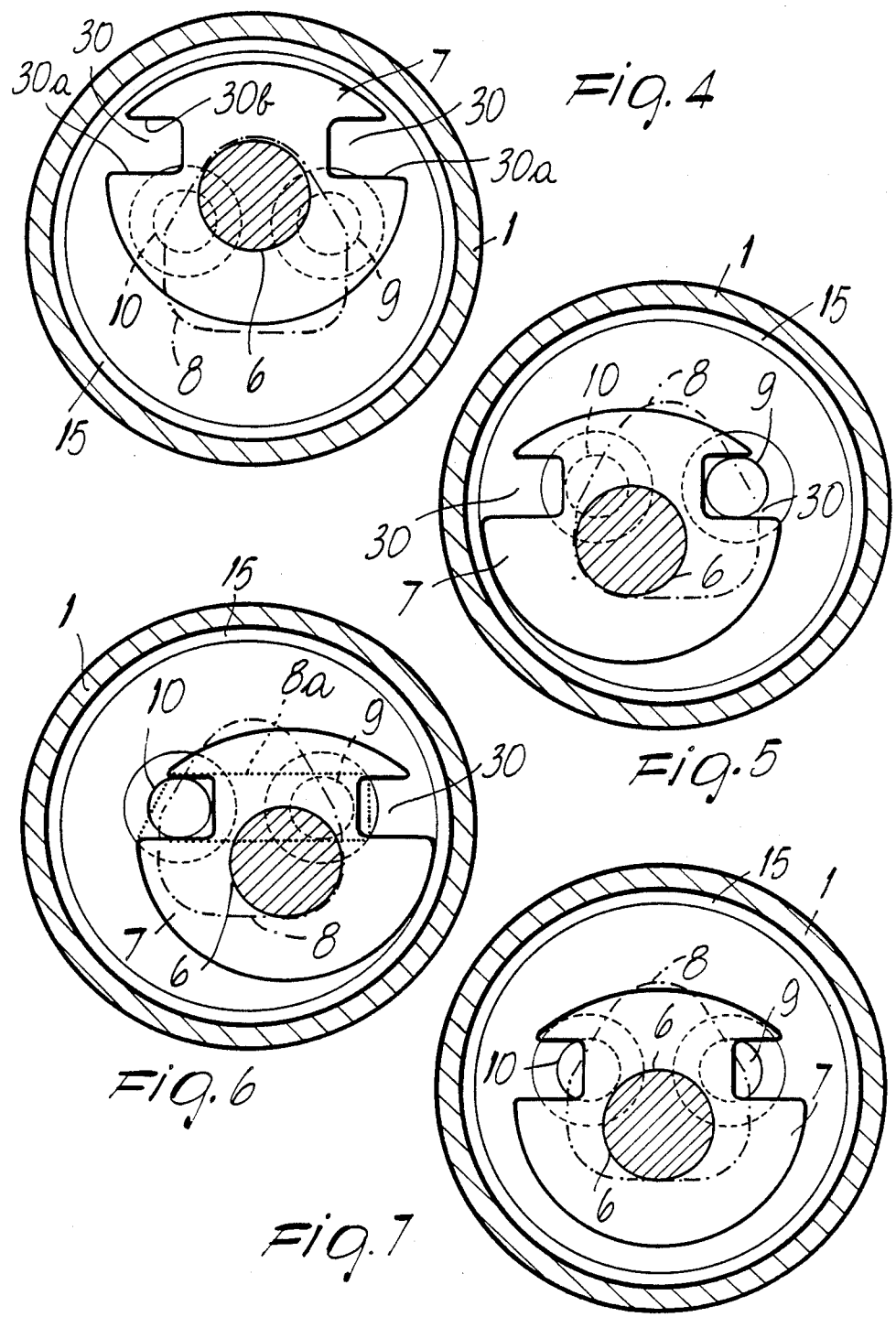

VALVE ASSEMBLY FOR SINGLE-LEVER ACTUATED MIXER TAPS

BACKGROUND OF THE INVENTION

This invention relates to a valve assemlby for single-lever actuated mixer taps of the type having a flow controlling slide provided with peripheral recesses.

Valve assemblies with slides,which, instead of peripheral recesses have holes in the body of the slide, are not of interest for this invention.

U.S. Pat. No. 3,965,935 discloses a valve assembly for single-lever mixer taps which comprises essentially a bearing supporting a spherical body in sealed relationship, wherefrom there extend, at the top, an actuating lever accessible from the outside and, at the bottom, a pivot for connection to a ceramic disk slide accommodated in the mixing chamber and provided with peripheral recesses.

Said ceramic disk is movable over a pair of tubular seats of ceramics, respectively connected to the hot water and cold water supply conduits, which are urged elastically against the ceramic disk, thereby a valve assembly is formed.

For the desired delivery of water, along the periphery of the ceramic disk, there are provided triangular peripheral recesses which, by shifting the disk position, can be brought into alignment with orifices defined in the tubular seats, to thus obtain a desired delivery of water. It will be appreciated that the sealing contact between the disk and the tubular seats occurs on the annular edge or rim of the orifices of the tubular seats and the disk face in contact therewith.

In the extreme positions, one of which is represented by the delivery of just hot water or cold water, the ceramic disk would only overlie a small part of the annular edge of respective tubular seat orifice (see e.g. FIG. 4 of the cited U.S. Patent), so that it may happen that, owing to the unavoidable clearance, or play, of the tubular seat in its retaining guide cavity, the tubular seat tends to cock from its vertical axis perpendicular to the plane of lay of the ceramic disk. Consequently, during the subsequent closing phase, the corner edge of the triangular recess defined by the ceramic disk would in practice strike against the inward peripheral edge of the orifice of the top of the tubular seat, which being inclined because of the reason explained above, is at a higher level than the plane of lay of the ceramic disk bottom face. Repeated striking of the corner edge against the inward portion of the ceramic seat top edge results with time in a slightly abraded top edge of the tubular seat which,after a certain period of use, impairs the mating contact of the ceramic disk bottom surface and top edge of the tubular seat, so that an area is thus created where tightness deteriorates, which results in a dripping tap and the necessity of replacing the valve assembly.

SUMMARY OF THE INVENTION

It is a primary object of this invention to obviate such prior shortcomings by providing a valve assembly for single-lever actuated mixer taps, of the same general type as outlined above, which is so constructed as to hold, in any operating conditions, the axis of the tubular seats exactly perpendicular to the plane of lay of the ceramic disk bottom face, thereby the top edge of the tubular seats is always perfectly coplanar with the disk bottom face and no collision interference can occur between ceramic disk portions and the top edges of the tubular seats.

Another object of the invention is to provide an assembly as indicated, wherein the perfect coplanarity of the ceramic disk bottom face with the top edges of the tubular seats always produces a purely sliding type of contact between perfectly smooth surfaces, to thus eliminate problems of mutual wear of these two parts and hence ensure a perfectly tight fit even after prolonged operation.

It is a further object of the invention to provide a valve assembly for single-lever actuated mixer taps which, while affording a much improved performance, imposes no constructional complications over conventional approaches.

Yet another object of this invention is to provide a valve assembly which, by virtue of its pecularities, can give ample assurance of reliable and safe operation.

According to one aspect of the invention these and other objects, such as will be apparent hereinafter, are achieved by a valve assembly for single-lever actuated mixer tap comprising a bushing with a closed seat contour, and having therein a hard material slide having a sealing face and peripheral recesses and sealingly movable over orifices of a pair of hard material tubular seats in use in communication with the cold water and hot water supply conduits respectively and urged resiliently against said slide, the tubular seats having orifices with annular rims facing said sealing surface, the slidable sealing contact between the sealing face of the hard material slide and the tubular seats occurring on said annular rims of the orifices over variable contacting arcs of the annular rims, said hard material slide being movable within an area defined by said closed seat contour for the hard material slide from a fully open to a fully closed position for said orifices with operative intermediate positions,characterized in that said annular rims, said peripheral recesses and said closed seat contour have preestablished shapes and sizes causing the contact between said sealing face of the slide and the annular rims of each of the orifices to occur in at least three circumferentially spaced points of the contacting arcs, wherein two of said points lie in diametrically opposite position with respect to the circumference of each of the orifice rims, at least in the range between the fully open and half open position of the slide with respect to each of the orifices.

BRIEF DESCRIPTION OF THE DRAWINGS

Further features and advantages will be apparent from the following description of a preferred, but not limitative, embodiment of a valve assembly for single-lever actuated mixer tap, with reference, by way of exaple and not of limitation, to the accompanying drawings, where:

FIG. 1 is an axial section view showing schematically a single-lever actuated mixer tap incorporating the valve assembly of this invention;

FIG. 2 is an exploded view of the valve and actuator assembly;

FIG. 3 is a perspective view illustrating the configuration of the ceramic disk, wherei the dashed lines show the configuration of the shank for connection to the actuating lever; and FIGS. 4,5,6 and 7 illustrate schematically all of the possible extreme mutual positions of the ceramic disks and tubular seats, i.e. both orifices closed, one closed the other open, the other closed the one open, both half open, respectively.

DESCRIPTION OF THE PREFERRED EMBODIMENT

With reference to the drawing figures, a single-lever actuated mixer tap is shown, generally designated with the reference numeral 1, the interior whereof accommodates an actuator bushing 2 having a spherical body 3 arranged therein pivotally movable in tight relationship therewith. The spherical body 3 is provided at the top with an acuating lever 4, accessible from the outside, and, at the bottom, with a sperical dog 5 adapted for insertion into a sleeve 6 carrying at the bottom a disk 7 of hard material such as ceramics. The sleeve 6 is movable within an arc defined by a generally polygonal, preferably pentagonal seal contour 8 with rounded corners which is defined at the bottom by the bushing 2; the seat contour 8 delimits the maximum travel distance of the sleeve 6 and hence the disk 7. The ceramic disk 7 has its bottom face, which is perfectly smooth, in sliding contact with a pair of tubular seats indicated at 9 and 10, respectively, which communicates respectively to the cold water supply conduit and hot water supply conduit (not shown).

The tubular seats 9 and 10 have at the top a perfectly smooth orifice edge arranged to act on the disk 7 in contact relationship thereiwth. The recesses of the disk and the orifices of the tubular seats define in practice controllable ports opening into the mixing chamber 15 of the single-lever actuated mixer tap.

Each tubular seat 9 and 10 is urged resiliently against the disk 7 by the pressure of the water and the action of springs 20 with the interposition of a sealing means in the form of an O-ring 21, for example of the type described in U.S. patent application Ser. No. 314,946.

The cited ceramic disk 7 is formed with peripheral recesses, generally indicated at 30, which can be positioned relatively to the tubular seats such as to produce a desired delivery of water.

It will be appreciated that the sealing contact between the sealing face of the ceramic disk 7 and the tubular seats 9 and 10 always occurs on the free annular edge or rim of the orifices of the tubular seats, such annular rim or edge being perfectly coplanar with the sealing face of the ceramic disk 7. It will be further appreciated that the contact generally occurs along contacting arcs of variable extension. It will be further appreciated that a peculiar feature of the invention resides in that, for a given diameter dimension of the annular rim of the orifices of the tubular seats 9 and 10, the shape and the size of the recesses 30, and the shape and the size of the seat contour 8 are selected so that at least in the range between a fully open and half open condition of each of said orifice defined by the position of said recesses 30 with respect to said orifices, the contact along the contacting arcs occurs in at least three circumferentially spaced points, two of which are in diametrically opposite positions with respect to the orifice.

In other words, for any mutual positioning of the disk 7 and cylindrical seats 9 and 10, an ideal closed outline area defined by connecting together the outermost contact points on said disk and said cylindrical seats, 9 and 10, in all admitted relative positions thereof, would be intersected by the axis of the cylindrical seats. Said closed outline is schematically illustrated with dotted lines indicated with reference numeral 8a in FIG. 6.

For the purpose the seat contour 8 is preferably generally of pentagonal shape with rounded up corners and the peripheral recesses 30 have preferably a substantially C-like configuration, and are arranged opposite each other such that, at any positions shown in FIGS. 5-7, except the one of FIG. 4 allowed for the disk 7 both lobes 30a and 30b of the recesses 30 engage the top orifice edge of the cylindrical seats 9 and 10. This is a factor of great importance, since the pressure exerted by the seats 9, 10 on the disk 7 can in no case produce an inclination of the seat axis owing to the contact surface between the seat orifice edges or rims and disk being always greater than the non contacted surface of the seat orifice edges, so that the pressure forces applied cannot cause such inclination, when at lest one arc of contact is greater than half the annular periphery of the orifice edges.

This because the center of area of the top orifice rim surface of the tubular seats is always enclosed within the closed outline 8a interconnecting the outer contact points. Other shapes and sizes of the seat contour 8 and the recesses 30 may be adopted. An inventive way to do this is by preparing transparent masks on which the shape of the contours and outlines are tentatively traced and adjusted by shifting the masks in the various possible relative positions.

By preventing the cylindrical seats from being inclined, a perfect parallelism is always maintained between the contact surfaces of the ceramic disk 7 and ceramic cylindrical seats 9, 10, so that only a sliding movement can occur between the contacting parts, which can in no way result into wear-producing impacts as was instead the case with prior solutions.

It should be further noted that the configuration adopted for the peripheral recesses 30 is such that in operative conditions an adequate orifice aperture is always maintained for the delivery of water and undesired throttling or flow reductions are effectively prevented.

To achieve this object, the distance between the two lobes 30a, 30b of the C-like peripheral recesses 30 is advantageously equal to or smaller than the effective aperture defined by the orifices of the tubular seats 9 and 10.

It will be appreciated from the foregoing that the invention achieves its objects, and in particular it should be emphasized that the particular configuration and construction of the ceramic disk 7 are such that in any operating conditions, as schematically shown in FIGS. 4 to 7, the "coverage" of the cylindrical seats 9, 10 by the disk 7 always prevents the possiblity for the seat axis to take an inclination, while eliminating the likelihood of collision interference between the corner edges delimiting the peripheral recesses 30 and the orifice edges.

The invention as described in susceptible to many modifications and variations without departing from the scope of the instant inventive concept.

Furthermore, all of the details may be replaced with other technically equivalent elements.

In practicing the invention, the materials used, if compatible with the intended applicaiton, and the dimensions and contingent shapes, may be any selected ones to meet individual requirements.

I claim:

1. A valve assembly for single-lever actuated mixer taps, comprising a bushing with a closed seat contour, and having therein a hard material slide having a sealing face and peripheral recesses and sealingly movable over orifices or a pair of hard material tubular sats in use in communication with the cold water and hot water supply conduits respectively and urged resiliently against said slide, the tubular seats having orifices with projecting annular rims slidably contacting said sealing face, the slidable sealing contact between the sealing face of the hard material slide and the tubular seats occuring on said annular rims of the orifices over variable contacting arcs of the annular rims, said hard material slide being movable within an area defined by said closed seat contour for the hard material slide from a fully open to a fully closed position for said orifices with operative intermediate positions, characterized in that said annular rims, said peripheral recesses and said closed seat contour have preestablished shapes and sizes causing the contact between said sealing face of the slide and the annular rims of each of the orifices to occur in at least three circumferentially spaced points of the contacting arcs, wherein two of said points lie in diametrically opposite position with respect to the circumference of each of the orifice rims, at least in the range between the fully open and half open position of the slide with respect to each of the orifices.

2. An assembly according to claim 1, characterized in that said peripheral recesses have a substantially C-like configuration.

3. An assembly according to claim 2, characterized in that said peripheral C-like recesses are arranged opposite each other.

4. An assembly according to claim 2, characterized in that said slide has a connection sleeve and said peripheral recesses are located offcentered relatively to said sleeve.

5. An assembly according to claim 2, characterized in that the aperture width of said C-like recesses is substantially equal to or smaller that the diameter of the orifices of each said tubular seats.

6. An assembly according to claim 1, characterized in that said seat contour has generally a pentagonal shape, with rounded corners.

7. A valve assembly for single handle actuated mixer taps, comprising a hollow valve body, a bushing member arranged in said hollow body, control means rigid with said handle and arranged in said bushing member, a connection member facing said bushing at a distance therefrom, hard material tubular seats arranged in said connection member and in communication with hot water and cold water supplies, said tubular seats being resiliently received in said connection member and having coplanar orificies defining annular rims projecting from said connection member towards said bushing member, a hard material slide plate arranged between said bushing member and said tubular seats, said hard material slide plate having on one side thereof a sealing face slidably and sealingly contacting said coplanar annular rims resiliently urged thereagainst and on the other side thereof a formation in engagement with said control means for actuating through said handle said slide plate thereby the slidable sealing contact between said sealing face and said coplanar annular rims occurring over variable contacting arcs of the annular rims, said bushing member having a closed guiding inside contour delimiting an area within which said slide plate is movable upon actuation of said handle, said slide plate having peripheral recesses for selectively uncovering said orifices defined by said annular rims and wherein said closed guiding inside contour of said bushing has a generally pentagonal shape with rounded corners and said slide plate has a circular periphery, said peripheral recesses thereof have a generally C-like configuration and are arranged opposite to each other and symmetrically with respect to a first diameter of said slide plate and offset with respect to a second diameter of said slide plate, which is perpendicular to said first diameter, said peripheral C-like recesses not exceeding in size the size of said orifices, thereby causing the sliding contact between said sealing face of the slide plate and the annular rims of each of the orifices to occur in at least three circumferentially spaced points of the contacting arcs, wherein two of said points lie in diametrically opposite positions with respect to the circumference of each of the orifice rims, at least in the range between the fully open and half open position of the slide plate with respect to each of the orifices.

* * * * *